(12) United States Patent
Giebel et al.

(10) Patent No.: US 6,206,290 B1
(45) Date of Patent: Mar. 27, 2001

(54) CONTROL SYSTEM FOR OSCILLATING OPTICAL ELEMENT IN SCANNERS

(75) Inventors: James Giebel, East Northport; Thomas Mazz, Huntington; Constanzo DiFazio, Islip; Mik Stern, Flushing; David Goren, Ronkonkoma, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/035,763

(22) Filed: Mar. 6, 1998

(51) Int. Cl.$^7$ .................................................. G06K 7/10
(52) U.S. Cl. ............................. 235/462.36; 235/462.32
(58) Field of Search ...................... 235/462.32, 462.25, 235/462.36, 462.33, 462.37

(56) References Cited

U.S. PATENT DOCUMENTS

| | | | |
|---|---|---|---|
| 4,571,603 | 2/1986 | Hornbeck et al. | 235/462.01 |
| 4,733,067 | * 3/1988 | Oinoue et al. | 250/216 |
| 4,754,185 | 6/1988 | Gabriel et al. | 310/309 |
| 4,816,660 | 3/1989 | Swartz et al. | 235/472.01 |
| 5,096,279 | 3/1992 | Hornbeck et al. | 359/230 |
| 5,097,354 | 3/1992 | Goto | 359/212 |
| 5,099,386 | * 3/1992 | Stokes et al. | 361/298 |
| 5,100,220 | * 3/1992 | Voegeli | 385/14 |
| 5,110,195 | * 5/1992 | Loney | 359/224 |
| 5,132,524 | * 7/1992 | Singh et al. | 235/467 |
| 5,159,498 | * 10/1992 | Hubbard, Jr. | 359/847 |
| 5,202,785 | 4/1993 | Nelson | 359/214 |
| 5,216,537 | 6/1993 | Hornbeck | 359/291 |
| 5,280,277 | 1/1994 | Hornbeck | 345/108 |
| 5,457,566 | 10/1995 | Sampsell et al. | 359/492 |
| 5,491,680 | 2/1996 | Pauli | 369/112 |
| 5,497,231 | * 3/1996 | Schmidt | 356/334 |
| 5,535,047 | 7/1996 | Hornbeck | 359/295 |
| 5,561,283 | * 10/1996 | Dvorkis et al. | 235/462 |
| 5,625,483 | 4/1997 | Swartz | 359/224 |
| 5,818,623 | * 10/1998 | Valette et al. | 359/224 |
| 5,875,162 | * 2/1999 | Baba | 369/44.35 |
| 5,902,989 | * 5/1999 | Metlitsky et al. | 235/472.01 |
| 5,914,480 | * 6/1999 | Swartz | 235/472 |

FOREIGN PATENT DOCUMENTS

460889A2  12/1991  (EP) .
467048A2  1/1992  (EP) .

OTHER PUBLICATIONS

Breng et al, Electrostatic Micromechanic Actuators, J. Micromech. Microeng. 2 (1992) pp. 256–261.
K.E. Peterson, Silicon Torsional Scanning Mirror, IBM J. Res. Develop. 24, pp. 631–637 (Sep., 1980).

* cited by examiner

Primary Examiner—Mark Tremblay
(74) Attorney, Agent, or Firm—Burns, Doane, Swecker & Mathis LLP (57) ABSTRACT

A miniature light beam scanner includes a moving optical element formed on a substrate with electrodes for driving the optical element and sensing its motion as indicated by a varying capacitance between the optical element and the substrate. Control and driver circuitry responsive to the variation in capacitance drives the optical element to move at a resonant frequency and predetermined amplitude.

30 Claims, 5 Drawing Sheets

CONTROL SYSTEM FOR OSCILLATING OPTICAL ELEMENT IN SCANNERS

BACKGROUND AND OBJECTS OF THE INVENTION

1. Field of the Invention

The present invention relates to light scanning systems for reading data. In preferred embodiments the invention is useful in compact moving spot scanning systems for reading bar code symbols.

2. Description of Related Art

Various optical scanning systems have been developed for reading bar code symbols. In many such systems a laser spot is swept across the bar code. The bar code symbols reflect or absorb the incident light. A photo detector receives reflected light and produces a signal from which the data is obtained. Normally, in such systems the laser spot scans the bar code symbols in such a way that it crosses all of the bars and spaces which make up the code. These various optical scanning systems require apparatus for sweeping the spot across the bar code symbol.

For this purpose, it is known to use a stationary source of light, a scanning mirror and a driver to repetitively oscillate the mirror, so that an incident light beam from the source is repetitively swept through an angular distance at a rate, for example, of tens of oscillations per second. Such a system is shown, for example, in U.S. Pat. No. 4,816,660 to Swartz et al. An electric motor may be used to drive the mirror. Alternatively, a swept beam may be produced by a semi conductor laser whose output beam is directed by a piezo-electric driver. Such a system is shown in U.S. Pat. No. 5,625,483 to Swartz et al. Magnetic fields may also be used to drive small mirror elements.

In motor driven mirror scanning systems, conventional motor controls are used to insure the appropriate scanning. In these systems, the components, such as photo diodes, mirrors, motor parts and control circuits are separately manufactured and then assembled. The components must be accurately aligned for proper operation. These production steps are costly. Use of a micro machined permits partial or total integration of the scanner into a miniature package with components formed on one or a few substrates. However, in a system based on the use of a driven, micro machined scanner element, there is the need to insure the proper movement of the scanner in a way which is compatible with the micro machined parts in terms of size and structure, and in terms of the manufacturing steps used to make the micro machined parts.

Micro machined scan mirrors have been described in prior art literature. However, there are unique challenges in designing a scan mirror for bar code scanning. In particular, the mirror is advantageously several millimeters on each side to accommodate the scan beam. Handheld bar code scanners operate at very low frequencies, scan large angles, and need to survive large shock loads. The mirrors may be operated at resonance in order to reduce power consumption. Low resonant frequency dictates a large mass on relatively weak suspension, which makes it difficult to provide the required shock resistance. Another important requirement is low cost.

A micro machined mirror for scanning a light beam is disclosed in U.S. patent application Ser. No. 08/483,163 filed Jan. 7, 1995 to Swartz et al. entitled AN INTEGRATED SCANNER ON A COMMON SUBSTRATE, which is hereby incorporated by reference. In this system, the mirror may be driven by various techniques including electrostatic actuation, electromagnetic actuation, and heat actuation. However, such mirrors are difficult to operate due to the high Q of the mechanical system and the drive requirements for such a system.

OBJECTS OF THE INVENTION

Accordingly, it is an object of the present invention to provide a simply and inexpensively fabricated miniature light beam scanner having an accurately controlled, moving optical component, such as a mirror.

It is a further object of the present invention to provide a simple and accurate system for sensing the position of a moving, micro machined optical element in a light beam scanner.

It is a further object of the present invention to provide a system for controlling at least one of the amplitude and frequency of a moving optical element in a light beam scanner.

It is a further object of the present invention to provide a system for controlling a micro machined, resonant mirror for hand-held bar code readers.

These and other objects and features of the present invention will be apparent from this written description and drawings.

SUMMARY OF THE INVENTION

A light beam scanner is controlled to direct a light beam to move in a predetermined pattern such as a back and forth pattern traversing a symbol to be read. The scanner includes an optical element, such as a micro machined mirror, at least a portion of which is moveable in relation to a supporting substrate and/or a light source.

An electrically actuated driver applies a driving force to the optical element. In a preferred embodiment, the electrically actuated driver is a driving electrode located proximate to the mirror and a voltage controlled power supply, which together provide an electrostatic driving force.

A sensor detects movement of the optical element, for example by detecting variations in the capacitance between a pick-up electrode and the mirror caused by motion of the mirror. In preferred embodiments, a carrier signal is applied to the mirror, and a varying voltage signal is induced in the pick-up electrode containing information concerning the amplitude and phase of the movement of the optical element relative to the pick-up electrode.

Feed back circuitry controls the electrically actuated driver to drive the optical element at a resonant frequency and predetermined amplitude.

A related method is disclosed for controlling a moving optical element, which involves applying a periodically varying electrostatic force to the optical element to vary its position, sensing the position of the mirror, and modifying the applied electrostatic force in response to the sensed mirror position.

A scanner element of a preferred embodiment of the present invention includes an optical element, which provides a light beam having direction which varies as the element moves. In a preferred embodiment, the optical element is a micro machined mirror suspended for torsional oscillation on a pair of conductive hinges. One or more electrodes are formed on the substrate adjacent the optical element to apply an electrostatic driving force to the optical element and to sense the position of the element.

The subject matter of the invention is set out with particularity in the appended claims.

BRIEF DESCRIPTION OF THE DRAWINGS

The particulars of the present invention will be understood from the following descriptions, considered with the drawings, in which.

DETAILED DESCRIPTION OF THE DRAWINGS

Figure 1:
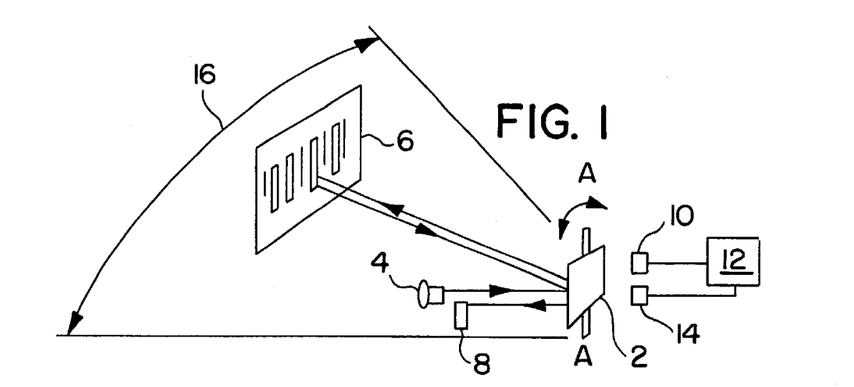
FIG. 1 is a partial schematic and perspective view of a bar code scanner including a moving optical element, sensor and driver.

FIG. 1 illustrates schematically a system for sensing the position and controlling the movement of an optical element in a light beam scanner. The optical element may be a mirror, photo diode, refractive body, polarizing body, or other optical element whose movement alters the direction of an incident and/or outgoing light beam. In the embodiment of FIG. 1, the moving optical element 2 is a mirror, mounted for rotation about an axis A—A. A semiconductor laser 4 provides a beam of light which is reflected by the mirror in the general direction of a bar code symbol 6.

The system shown in FIG. 1 is retro reflective, i.e. light reflected by the bar code impinges on the mirror, from which it is reflected to a photo detector 8. It will be apparent, however, that the teachings of the present invention may be applied to non retro reflective systems in which light reflected by the bar code system does not return to the moving optical element, but is instead directed along a fixed beam path to a lens and photo diode. In either case, the detector communicates with circuitry (not shown), which decodes data from the bar code.

The moving mirror 2 of FIG. 1 is driven by a driver 10 responsive to electrical signals provided by control circuitry 12. A mirror position sensor element 14 is employed in the detection of mirror position. The control circuitry 12, produces a signal responsive to mirror position, drives the oscillation of the scan mirror at its mechanical resonance and regulates the amplitude of the oscillation of the mirror. This, in turn, assures that the beam of light reflected from the mirror 2 scans through a predetermined angular range 16, adapted to sweep across the bar code symbol 6.

Figures 2A, 2B, 3:
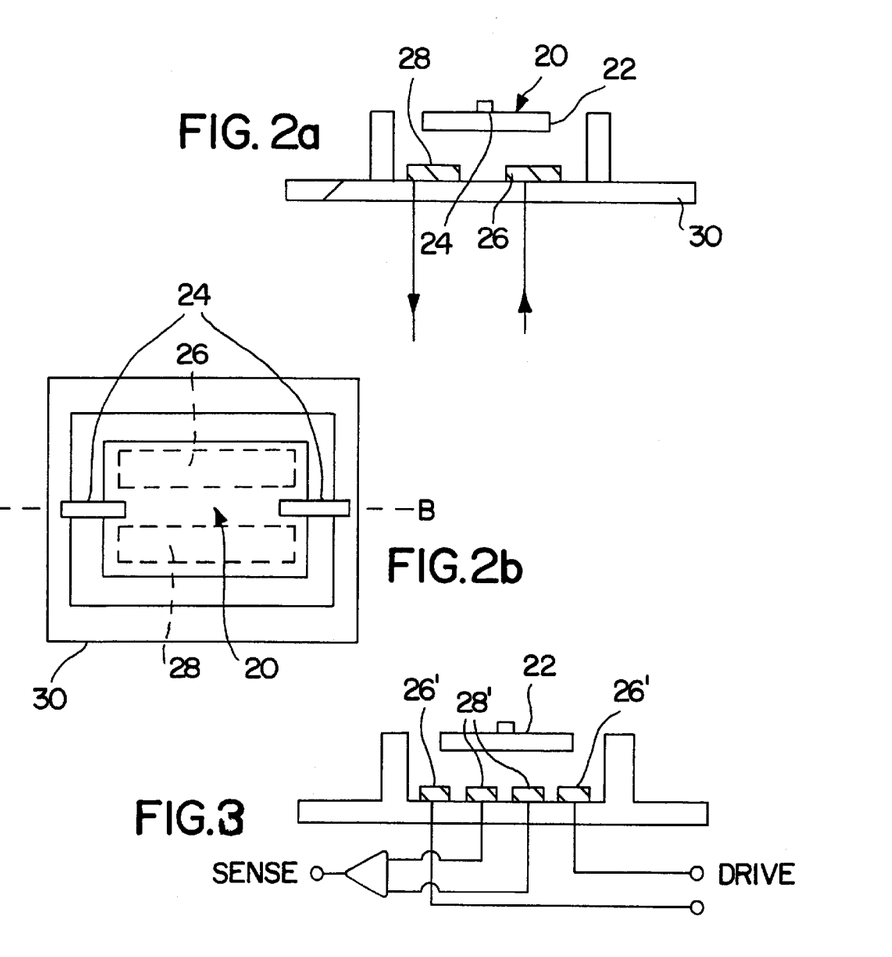
FIGS. 2a and 2b are, respectively, side and plan views of an electrostatically driven, micro machined scan element employed in embodiments of the present invention.
FIG. 3 is a side view of an electrostatically driven, micro machined scan element of an alternate embodiment of the present invention and associated circuitry.

FIGS. 2a and 2b are, respectively, side and plan views of an electrostatically driven micro machined scan element 20. The scan element 20 can be manufactured using either monolithic integration or hybrid integration. techniques. In a preferred embodiment, the scan element is fabricated on a substrate 30. The substrate may be a semiconductor material such as silicon and the micro machined mirror fabricated using known VLSI technology.

The scan element 20 of FIG. 2 consists of a scan mirror 22 suspended by two electrically conductive torsional hinges 24 over two substrate electrodes 26 and 28. The mirror is rotated about its hinges by applying a voltage to one electrode (drive pad 24) thereby producing an electrostatic force between the drive pad and the mirror. When a voltage is applied and removed from the drive pad, the mirror scan element acts as a driven torsional oscillator and the mirror 22 rotates about an axis B—B defined by its hinges. The rest position of the mirror 22 is shown in FIG. 2a and is a position in which the principal plane of the mirror is parallel to the principal plane of the substrate 30. The scan element is designed to rotate about an axis B—B by approximately +/−20 degrees from the rest position, at a frequency of less than 100 Hz and preferably at a frequency of between 20 and 30 Hz.

The other electrode (pick-up pad 28) is used for sensing the position of the mirror. The position of the mirror is detected by sensing the capacitance between the pick-up pad and the mirror. This capacitance varies in inverse proportion to the distance between the mirror 22 and the pick-up pad 28.

During operation, a voltage is applied to drive pad 26, which applies an electrostatic force to rotate the mirror 22. The applied voltage creates charges of opposite polarity between the drive pad 26 and the mirror 22. The resulting attractive force pulls the closer side of the mirror 22 downward, thus rotating the mirror 22 about rotation axis B—B.

Alternatively, the mirror may be rotated by application of electromagnetic force. Magnetic field sensing may be used in conjunction with appropriate circuitry to determine mirror motion and control the mirror driver.

FIG. 3 illustrates an alternative arrangement of electrodes useable in various embodiments of the scan element and associated circuitry. Two drive electrodes 26' are provided in the scan element of FIG. 3 and are biased with voltages to apply driving forces to both sides of the mirror. In this way the desired mirror amplitude may be induced by applying smaller voltages. Two sensor electrodes 28' sense the position of the mirror. An improved signal to noise ratio in the detection signal can be obtained by using this sensor electrode structure.

Figure 4A:
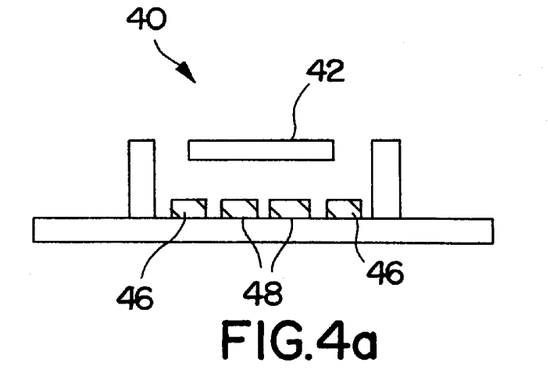
FIGS. 4a and 4b are, respectively, side and plan views of an electrostatically driven, micro machined scan element adapted for scanning two-dimensional bar codes and employed in embodiments of the present invention.
Figure 4B:
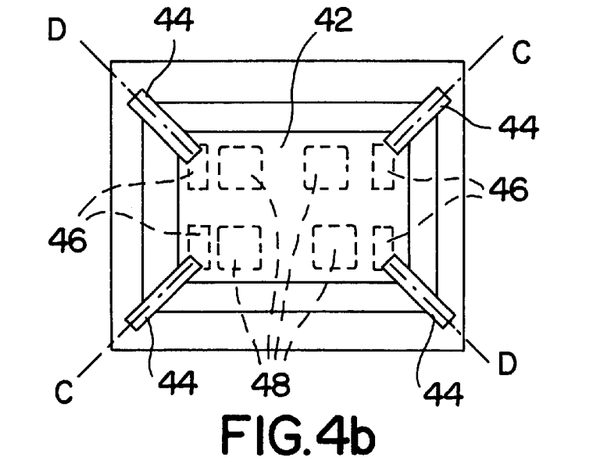

FIGS. 4a and 4b illustrate another alternative structure for a scan element usable in embodiments of the present invention. FIGS. 4a and 4b illustrate, respectively, side and plan views of a scan element 40 which provides two dimensional scanning. The scan element 40 consists of a scan mirror 42, suspended on four beams 44. A beam scanner of this type is illustrated, for example, in U.S. Pat. No. 5,097,354 to Goto. In operation, the mirror can be driven to rock about two axes identified as C—C and D—D by drive pads 46.

The scan element of FIG. 4 includes pick-up pads 48, which are used for sensing the position of the mirror 42 by sensing the capacitance between the mirror and each of the pick-up pads 48.

Two dimension scanning may also be achieved by using two one-dimensional scanning optical elements such as shown in FIGS. 2a and 2b to vary the direction of the light beam in orthogonal directions.

Figure 5:
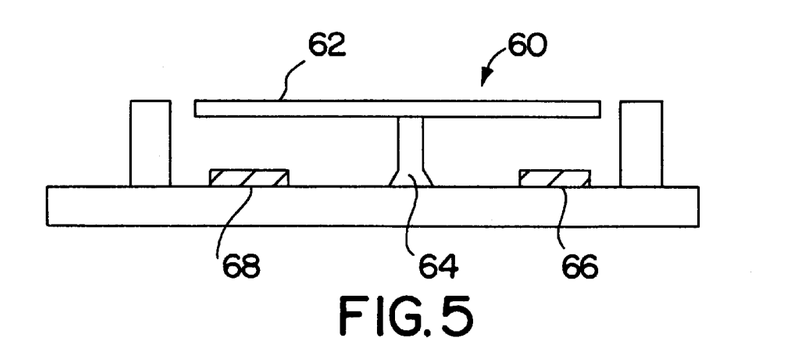
FIG. 5 is a side view of an electrostatically driven, cantilever mounted micro machined scan mirror and associated electrodes employed in embodiments of the present invention.

FIG. 5 illustrates another alternative scanning element 60, in which a moving mirror 62 is mounted on a central pillar 64. Electrode 66 is a drive pad and electrode 68 is a pick-up pad. Electrostatic force is employed to drive the mirror in periodic motion. The position of the mirror is sensed by detecting the capacitance between the mirror and pad 68 as discussed below.

Figure 6A:
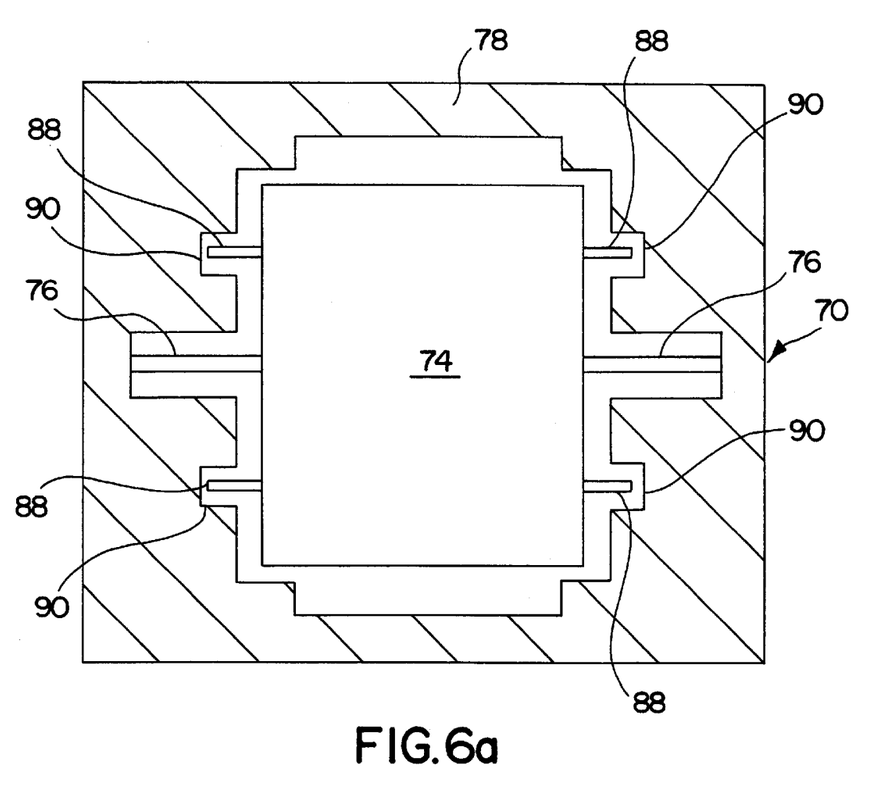
FIGS. 6a and 6b are, respectively, a top view of a micro machined mirror die and a side cross sectional view of a packaged scan element of a preferred embodiment of the present invention.
Figure 6B:
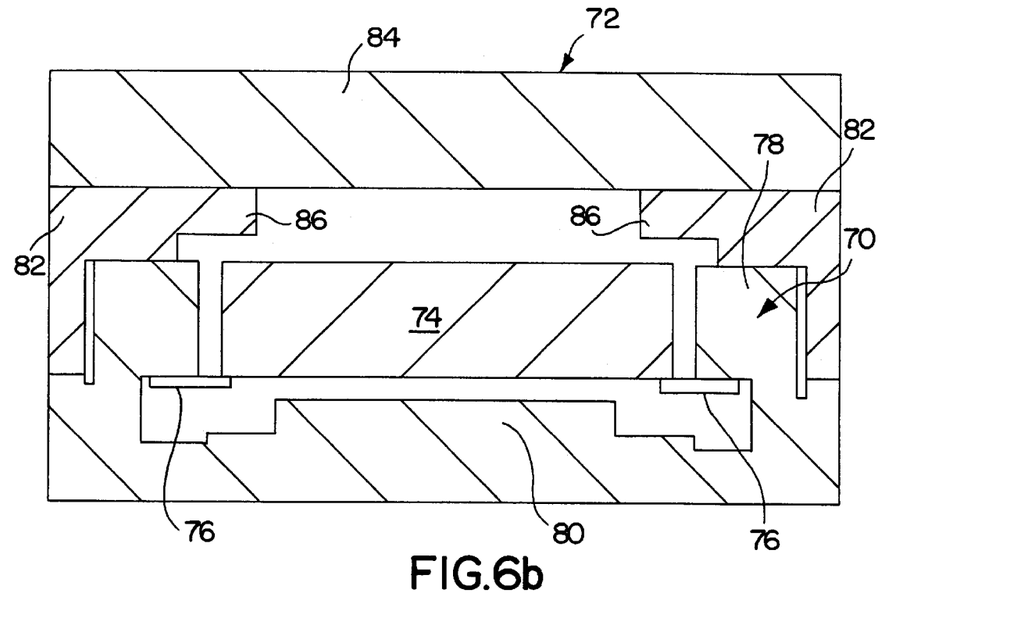

FIGS. 6a and 6b show preferred embodiments of a micro machined mirror die 70 and packaged scan element 72, respectively. The Figures illustrate certain fabrication information and structures adapted to protect the scan element from mechanical shock.

Referring first to FIG. 6a, a gold coated silicon island 74 acts as a mirror and is suspended by two hinges 76 on the silicon frame 78. A mirror size of 3×3 mm (i.e. on the order of 10 mm² in area) may be used to accommodate the scanning light beam, and to account for positioning errors in the assembly. The micro machined die shown is a flip-chip adapted to be surface-mounted on a substrate. The island is grounded with respect to the drive and pickup electrodes (not shown).

The packaged scan element of FIG. 6b includes the micro machined mirror die 70, a ceramic travel stop 80 and KOVAR travel stops 82. A cover glass 84 protects the mirror surface. An anti-reflection coated on the glass may be employed to reduce optical losses. In a preferred embodiment the dimensions of the packaged scan element are 7.5×6×2 mm.

Fingers below and above the hinges 76 are provided to limit the up and down motion of the island on impact, without interfering with the rotation of the mirror. The fingers 86 on the reflector side overhang the edge of the mirror, but leave most of the reflective surface unobstructed. The frame 78 also serves as the side travel stop. For additional protection four fingers 88 (FIG. 6a) may be provided protruding from the island into corresponding cutouts 90 in the frame to limit travel when the mirror is subjected to a shock. The frame has vents on the sides to allow free air passage during operation.

The packaged scan element is designed for wafer scale assembly, which significantly reduces the device cost. Since the electrical connections are made via the bottom substrate, the device is surface mountable, and can be handled in a manner similar to other electronic components during the higher level assembly.

A device dimensioned in accordance with FIGS. 6a and 6b and the foregoing description may be designed to have a resonant frequency of from 25 to 35 Hz. Added circuitry generates the required drive voltage from a 3 V power supply. The power consumption of the mirror and the drive circuit may be about 10 mW, but most of the power is consumed by the voltage converter. Such packaged scan elements may operate over a temperature range of close to 100 degrees Celsius, and be able to withstand more than a 2,000-g acceleration.

Figure 7:
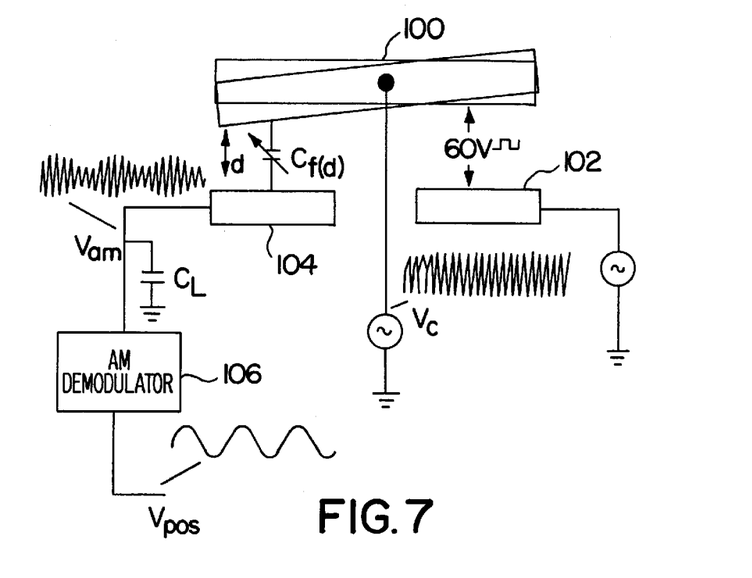
FIG. 7 is a schematic block diagram of a moving optical element, driver, detection and control circuitry employed in a scanning system of an embodiment of the present invention.

FIG. 7 illustrates in greater detail how the position of a moving optical element such as mirror 100 is detected. The mirror is set in motion, for example, by a 60V square wave, sine wave, or non-periodic pulse imposed on a drive pad 102. The position of the mirror is detected by sensing the varying parasitic capacitance $C_{f(d)}$ between the mirror 100 and a pick-up pad 104. This capacitance, which is extremely small (0.05 pF), is sensed by placing a high frequency carrier voltage $V_c$ on the mirror and detecting the induced voltage $V_{am}$ on the pick-up pad 104. It will be understood that $V_{am}$ is amplitude modulated (AM) by the position of the mirror in response to the changing capacitance between the mirror and the pick-up pad. An AM demodulator 100 is then used to recover the envelope of the AM signal which is the position signal. The input voltage to the AM demodulator $V_{am}$ results from the voltage divider action of $C_{f(d)}$ and load capacitor $C_L$. The voltage $V_{am}$ is an AM waveform that can be approximated as $$V_{am}=V_c/(1+C_L/C_{f(d)})=A\cos(w_c t)/(1+C_L/C_{f(d)})$$

$A\cos(w_c t)$ is the high frequency carrier $V_c$ and $C_{f(d)}$ is the function that describes the capacitance between the mirror and the pick-up pad as a function of distance d.

$C_{f(d)}$ can be approximated as $C_{f(d)}=C_d \cos(w_o t+\phi)+C_0$ $C_d$ is the change in $C_{f(d)}$ resulting from mirror movement, $C_0$ is the value of $Cf(d)$ when the mirror is at rest, $\phi$ is the phase shift of the mechanical system measured with respect to the phase of the driving voltage, and $w_o$ is the frequency of the driving voltage. The output of the AM demodulator 106 is $V_{pos}$ which is the mirror position signal.

It will be understood that by superimposing signals of different frequency, a single electrode may be employed as the drive pad and pick-up pad.

Techniques for controlling the scan element system and driving it at its natural resonance frequency will now be described with reference to FIGS. 8 and 9. A scan element control system for moving mirror 200 is shown schematically in FIG. 8. This system oscillates the mirror 200 at mechanical resonance by creating a drive signal based on positive feedback derived from the sensed mirror position. The use of positive feedback creates instability in the system which causes oscillation. The gain and phase of the positive feedback loop is chosen such that oscillation will only occur at the resonant frequency of the scan element. An amplitude control loop is also provided to regulate scan amplitude.

Figure 8:
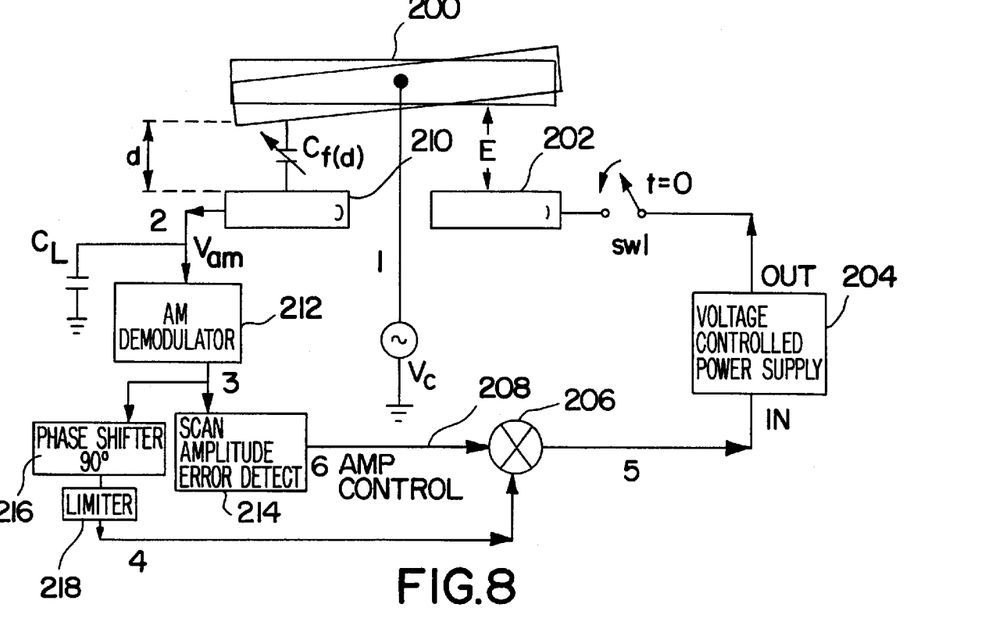
FIG. 8 is a schematic block diagram of a moving optical element, driver, detection and control circuitry employed in a scanning system embodiment of the present invention.

In FIG. 8 the mirror 200 is driven by an electrostatic force created by a periodic voltage imposed on drive pad 202 by a voltage controlled power supply 204 that has an adjustment range from 0V to 240V, and is controlled by the output of a chopper 206. The high state of the chopper's output is controlled by an output signal 208 based on a determined amplitude error. The chopper, in turn, controls the output level of the power supply 204. When the output of the chopper is low, the power supply is off.

The frequency at which the power supply 204 is switched on and off, as well as how hard the mirror is driven, depends on the feedback from the mirror. Mirror position is detected as previously described in connection with FIG. 7, by pick-up pad 210 and an AM demodulator 212. The output of the Am demodulator 212 contains both scan amplitude and mirror phase information. Scan amplitude information, i.e., the magnitude of the position signal at its peaks, is used to regulate scan amplitude via the scan amplitude error detector 214. Mirror phase information determines when the power supply will be switched on and off. The phase of the feedback is determined by the phase shifter 216 and limiter 218. A phase shift of 90 degrees may be used to compensate for phase shift caused by the mechanical system.

Figure 9:
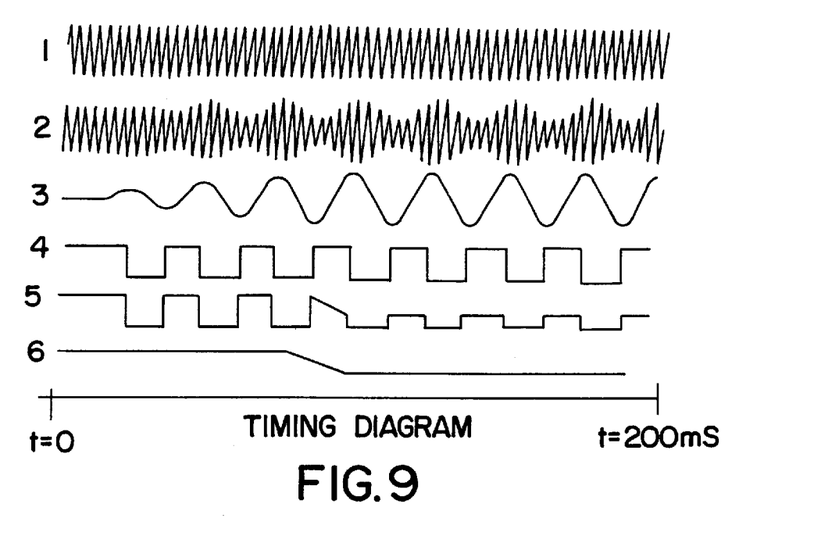
FIG. 9 is a graph of various waveforms discussed in connection with the description of the circuitry of FIG. 8.

The operation of the circuitry of FIG. 8 is reflected in the waveform diagrams of FIG. 9 which show the signals found at the corresponding numerical locations in the circuitry of FIG. 8 as a function of time. The time period represented in FIG. 9 begins when power is applied (t=0). Steady state is reached in the example at t=200 mS. At t=0, the initial conditions of the system are as follows:

(a) Scan mirror high frequency carrier (1) is on;
(b) Scan mirror is at rest (signal (2) is unmodulated and scan amplitude (3) is zero);
(c) Scan amplitude error detector output signal (6) is at maximum (the error is large because scan amplitude is zero);
(d) Limiter output signal (4) is high. Output signal 6 high is passed through chopper 206 to a control input of the Voltage Controlled Power Supply 204;
(e) The output of Voltage Controller Power Supply 204 (not shown) is at maximum (the loop is trying to remove scan amplitude error by driving the mirror with maximum drive voltage).

After t=0, the transient produced by sw1 closing causes the system to oscillate at a resonant frequency of the scan element. Maximum drive voltage is used until the scan amplitude approaches the required steady state level. As the scan amplitude grows, the amplitude control signal (6) is reduced because scan amplitude error diminishes. At steady state, the scan amplitude error has been removed, the power supply output voltage is regulated at a voltage that maintains minimal scan amplitude error, and the power supply is switched on and off at the scan element's resonant frequency.

The circuitry of FIG. 8 may be adapted so that it may be formed in the same semiconductor substrate as the scan element. This provides a compact, inexpensive scanner on a chip.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. A light beam scanner for directing a light beam used to traverse a symbol to be read comprising:
    a light source;
    a mirror for reflecting light from the light source,
    a drive electrode for applying electrostatic force to the mirror to vary its position so that the direction of reflected light is varied;
    a pick-up electrode for sensing the position of the mirror; and
    feedback circuitry for modifying the applied electrostatic force in response to the sensed mirror position,
    wherein the electrostatic force is periodically applied to the mirror by imposing a periodic voltage on the drive electrode and wherein the position of the mirror is sensed by detecting variations in the capacitance between the mirror and the pick-up electrode, and
    wherein a carrier signal is applied to the mirror and a voltage is induced on the pick-up electrode, which induced voltage corresponds to the carrier signal, amplitude modulated in response to changes in distance between the mirror and the pick-up electrode.

2. The light beam scanner of claim 1, wherein at least the mirror, drive electrode and pick-up electrode are formed on a single substrate.

3. The light beam scanner of claim 1, further comprising generator circuitry for providing the carrier signal; and
    generator circuitry for providing the periodic voltage imposed on the drive electrode; and
    wherein the feedback circuitry controls at least one of the frequency and amplitude of the periodic driving voltage in response to detected variations in capacitance between the mirror and the pick-up electrode.

4. The light beam scanner of claim 1, wherein the mirror is pivotably mounted on the substrate by at least one grounded conductive member.

5. The light beam scanner of claim 1, wherein the mirror is suspended on the substrate by conductive members defining a pivoting axis of the mirror.

6. A miniature light beam scanner formed on a semiconductor substrate for detecting optical properties of a scanned target comprising:
    means for directing a light beam in a direction dictated by the position of said means;
    means for applying a driving force to vary the position of said directing means and for electrically sensing the position of said directing means; and
    means for modifying the driving force in response to the sensed position of said directing means to cause the light beam directing means to oscillate at a resonance frequency and predetermined amplitude,
    wherein the means for sensing the position of the directing means comprises one or more electrodes on the semiconductor substrate coupled by an electric field to the means for directing the light beam.

7. The miniature light beam scanner of claim 6, wherein the means for applying the driving force includes a heat actuated structure supporting the directing means.

8. The miniature light beam scanner of claim 6, wherein the means for applying the driving force includes means for applying a periodic electrostatic force to the light beam directing means.

9. The miniature light beam scanner of claim 6, wherein the light beam directing means includes a semiconductor laser.

10. The miniature light beam scanner of claim 6, wherein the light beam directing means includes a mirror whose shape is varied in response to the driving force thereby varying the position of its reflective surface.

11. The miniature light beam scanner of claim 6, wherein the light beam directing means includes a mirror whose position is varied in response to the driving force and wherein the driving force is an electrostatic force.

12. The light beam scanner of claim 11, wherein the means for applying an electrostatic force comprises one or more electrodes on the semiconductor substrate coupled by another electric field to the means for directing the light beam.

13. The light beam scanner of claim 6, wherein the light beam directing means is a mirror formed on the chip pivotable about at least one axis.

14. A method for controlling a moving mirror which reflects a light beam in a light beam scanner comprising the steps of
    applying a periodically varying electrostatic force to the mirror to vary its position;
    sensing the position of the mirror; and
    modifying the applied electrostatic force in response to the sensed mirror position,
    wherein the position of the mirror is sensed by detecting variation in the capacitance between the mirror and a conductive pick-up pad located in proximity to the mirror.

15. The method of claim 14, wherein the electrostatic force is periodically applied to the mirror by imposing a periodic driving voltage on a conductive drive pad located in proximity to the mirror.

16. The method of claim 15, wherein the applied electrostatic force is modified in response to the sensed mirror position by controlling at least one of the frequency and amplitude of the periodic driving voltage in response to the sensed mirror position.

17. The method of claim 14, wherein the position of the mirror is sensed by locating the conductive pick-up pad proximate to the mirror so that the distance between the pad and at least a portion of the mirror varies as the position of the mirror is varied, wherein the variation in capacitance is detected by the following steps:

applying a carrier signal to the mirror; and detecting an induced voltage on the pick-up pad which corresponds to the carrier signal, amplitude modulated in response to changing distance between the mirror and the pick-up pad.

18. The method of claim 14, wherein the mirror is driven to rotate about an axis by applying a periodically varying electrostatic force to the mirror.

19. The method of claim 18, wherein the mirror is a torsional oscillator driven by the electrostatic force near its resonant frequency.

20. The method of claim 19, wherein the mirror torsionally oscillates at a frequency below 100 Hz.

21. Electromechanical oscillator and control system for light scanning, comprising:

an optical element at least a portion of which is moveable in relation to a supporting substrate;

an electrically activated driver for applying a driving force to the optical element;

a sensor for sensing movement of the optical element;

feedback circuitry for varying the applied driving force, wherein at least a portion of the optical element is driven to oscillate near a resonance frequency at a predetermined amplitude; and electronic circuitry for imposing a carrier signal on the optical element, wherein the sensor includes at least one electrode in proximity of the optical element in which a voltage is induced corresponding to the carrier signal whose amplitude has been modulated by movement of the optical element.

22. The system of claim 21, wherein the optical element is a reflector mounted for movement about an axis parallel to the principal plane of the mirror for torsional oscillation.

23. The system of claim 21, wherein the optical element is a reflector, cantilever-mounted for oscillatory bending motion.

24. The system of claim 21, wherein the resonance frequency is between 20 and 30 hertz.

25. The system of claim 21, wherein the feedback circuit comprises:

an AM demodulator; and a scan amplitude error detector for comparing an output signal from the AM demodulator with a reference to detect errors in the amplitude of oscillation of the optical element and for producing an amplitude control signal applied to the electrically activated driver.

26. The system of claim 21, wherein the optical element includes an integral reflector and detector for detecting light reflected from a bar code.

27. A control system for an oscillating optical element in light beam scanner, comprising:

an electrostatic driver for inducing oscillating motion of the optical element relative to a substrate on which the optical element is mounted;

a sensor on the substrate in which a varying voltage signal is induced containing information concerning the amplitude and phase of the movement of the optical element relative to the sensor; and feedback circuitry for controlling the electrostatic driver responsive to said signal, to drive the optical element at a resonant frequency and predetermined amplitude.

28. The control system of claim 27, wherein the feedback provided for controlling the electrostatic driver is positive feedback.

29. The control system of claim 27, wherein the optical element is a gold-coated island formed in a micro machined mirror die mounted on the substrate, and wherein the electrostatic driver and sensor include electrodes on the substrate.

30. The control system of claim 29, wherein the gold-coated island provides a mirror about 10 square millimeters in area.

* * * * *